United States Patent
Kikuchi et al.

(10) Patent No.: US 9,797,488 B2
(45) Date of Patent: Oct. 24, 2017

(54) VEHICULAR OPERATING DEVICE

(71) Applicant: Alps Electric Co., Ltd., Tokyo (JP)

(72) Inventors: Tsuyoshi Kikuchi, Miyagi-ken (JP);
Seishi Takahashi, Miyagi-ken (JP)

(73) Assignee: APLS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/877,634

(22) Filed: Oct. 7, 2015

(65) Prior Publication Data
US 2016/0101804 A1    Apr. 14, 2016

(30) Foreign Application Priority Data
Oct. 9, 2014    (JP) .................. 2014-208160

(51) Int. Cl.
| | |
|---|---|
| *H01H 3/16* | (2006.01) |
| *F16H 25/18* | (2006.01) |
| *H01H 3/50* | (2006.01) |
| *B60Q 1/14* | (2006.01) |

(52) U.S. Cl.
CPC .......... *F16H 25/18* (2013.01); *B60Q 1/1469* (2013.01); *H01H 3/50* (2013.01)

(58) Field of Classification Search
CPC .......... F16H 25/18; B60Q 1/1469; H01H 3/50
USPC ..................................... 200/61.27
See application file for complete search history.

(56) References Cited

U.S. PATENT DOCUMENTS

| | | | | |
|---|---|---|---|---|
| 4,321,437 A * | 3/1982 | Cryer | ............... | B60Q 1/1476 200/4 |
| 5,385,067 A * | 1/1995 | Wiersing | ............. | B60Q 1/1469 200/61.35 |
| 7,220,927 B2 * | 5/2007 | Browne | ................... | B60Q 1/40 200/61.27 |
| 7,453,048 B2 * | 11/2008 | Cordier | .................. | B60Q 1/425 200/61.27 |
| 2006/0185467 A1 * | 8/2006 | Giefer | ..................... | F16H 61/24 74/532 |

FOREIGN PATENT DOCUMENTS

JP         2010-185186         8/2010

* cited by examiner

*Primary Examiner* — Renee Luebke
*Assistant Examiner* — Lheiren Mae A Caroc
(74) *Attorney, Agent, or Firm* — Brinks Gilson & Lione (57) ABSTRACT

A vehicular operating device includes an operating member manipulated to swing, a slider slidably fitted in a holding bore, a cam surface positioned in front of the slider, and a helical compression spring pressing the slider into pressure contact with the cam surface. The metal-made slider includes a first outer peripheral surface with a diameter being smaller than an inner diameter of the helical compression spring, and a guide portion with an outer diameter allowing the guide portion to slide along an inner peripheral surface of the holding bore. A resin-made annular spacer having an outer diameter substantially equal to that of the guide portion is fitted between the guide portion and the helical compression spring. The helical compression spring biases the slider through the annular spacer. The annular spacer holds the helical compression spring in a state not contacting the first outer peripheral surface and the guide portion.

3 Claims, 6 Drawing Sheets

VEHICULAR OPERATING DEVICE

CLAIM OF PRIORITY

This application claims benefit of priority to Japanese Patent Application No. 2014-208160 filed on Oct. 9, 2014, which is hereby incorporated by reference.

BACKGROUND

1. Field of the Disclosure

The present disclosure relates to a vehicular operating device that is mounted in a vehicle and is used, for example, to light up a turn signal or to switch over a window wiper. More particularly, the present invention relates to a vehicular operating device capable of reducing abnormal noise in the operation and ensuring a good operation feeling.

2. Description of the Related Art

German Patent Publication DE19936484 discloses a switch that is used, for example, to light up a turn signal or to switch over a window wiper in an automobile.

Figure 7:
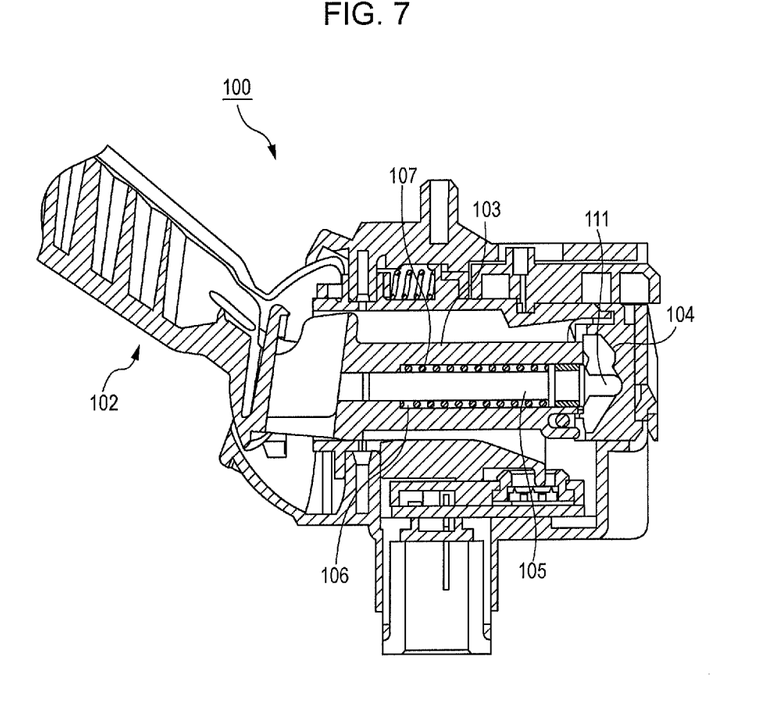
FIG. 7 is a sectional view of a related-art vehicular operating device.

FIG. 7 is a sectional view illustrating, as an example of a related-art vehicular operating device, a switch 100 disclosed in German Patent Publication DE19936484. The switch 100 includes an operating element 102 in the form of a lever or an arm, and a switching component 103 that is caused to swing together with the operating element 102. A control bolt 105 is fitted in a receiving chamber 106, which is formed in the switching component 103, to be able to advance and retract therein, and the control bolt 105 is biased in a direction to project by a helical compression spring 107 that is also fitted in the receiving chamber 106. A control cam 104 against which a head 111 of the control bolt 105 slides is disposed in front of the operating element 102.

When the operating element 102 is swung, the head 111 of the control bolt 105 biased by the helical compression spring 107 is caused to slide in a pressure contact with the control cam 104, and a control operation of returning the operating element 102 to a neutral posture, for example, is performed depending on the shape of the control cam 104.

Because the control bolt 105 made of a metal is biased toward the control cam 104 by the helical compression spring 107, a good operation feeling can be obtained However, due to an impact generated upon the control bolt 105 falling into a cam slot of the control cam 104 in the operation, the control bolt 105 and the helical compression spring 107 strongly collide against each other, thereby causing sounds of collision between metallic members. Thus, the above-described arrangement has a problem that abnormal noise in the operation is increased.

SUMMARY

A vehicular operating device includes an operating member manipulated in a swingable manner, a slider fitted in a holding bore formed in the operating member to be slidable in directions to advance and retract therein, a cam surface positioned in front of the slider in the advancing direction of the slider, and a helical compression spring pressing the slider into pressure contact with the cam surface, the slider sliding along the cam surface when the operating member is manipulated to swing, the slider being a metal shaft and including a first outer peripheral surface with a diameter being smaller than an inner diameter of the helical compression spring, and a guide portion with an outer diameter allowing the guide portion to slide along an inner peripheral surface of the holding bore, the slider further including an annular spacer made of resin, fitted between the guide portion and the helical compression spring, and having an outer diameter substantially equal to an outer diameter of the guide portion, the helical compression spring biasing the slider with the annular spacer interposed therebetween, the annular spacer holding the helical compression spring in a state not contacting the first outer peripheral surface and the guide portion of the slider.

With the swing manipulation of the operating member, the slider is caused to slide in a way of riding over a cam mountain on the cam surface and then falling into a cam slot. According to the features described above, since any outer peripheral surface of the slider is not directly contacted with the helical compression spring, abnormal noise due to collision between metals is not generated even when the impact generated upon the slider falling into the cam slot is applied to the helical compression spring. As a result, it is possible to reduce the abnormal noise in the operation, and to obtain a good operation feeling with the simple structure.

BRIEF DESCRIPTION OF THE DRAWINGS

FIG. 1 is a schematic view of a vehicular operating device according to an embodiment of the present invention; more specifically FIG. 1 is a longitudinal sectional view illustrating an initial state where an operating member is in a neutral posture;

FIG. 2 is a schematic view of the vehicular operating device according to the embodiment of the present invention; more specifically FIG. 2 is a longitudinal sectional view illustrating a state where the operating member is swung into an operative posture;

DESCRIPTION OF THE EXEMPLARY EMBODIMENTS

First Embodiment

An embodiment of the present invention will be described in detail below with reference to the drawings. It is to be noted that dimensions of individual components are changed as appropriate in the different drawings for the sake of easier understanding.

Figure 1:
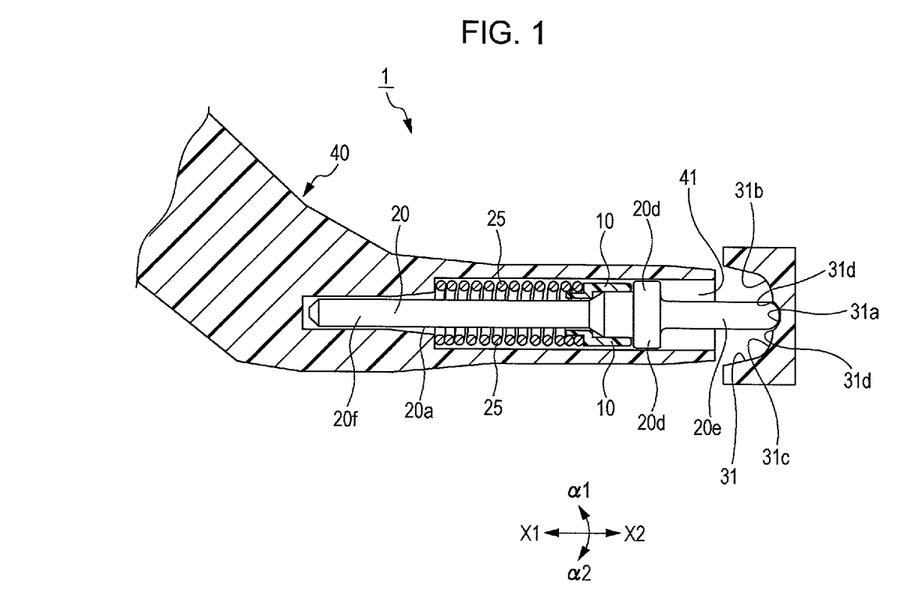
Figure 2:
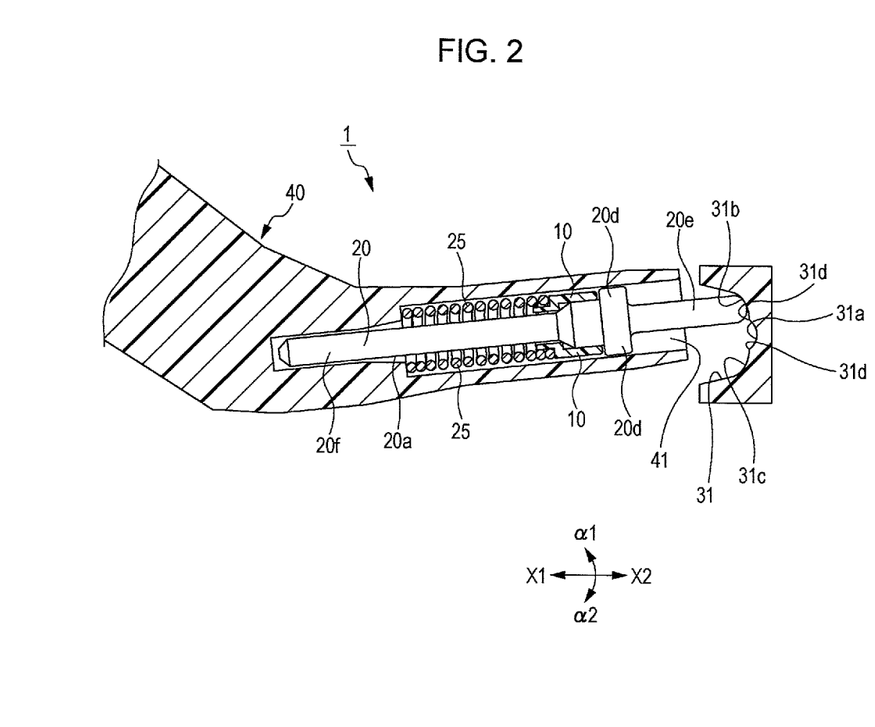
Figure 3:
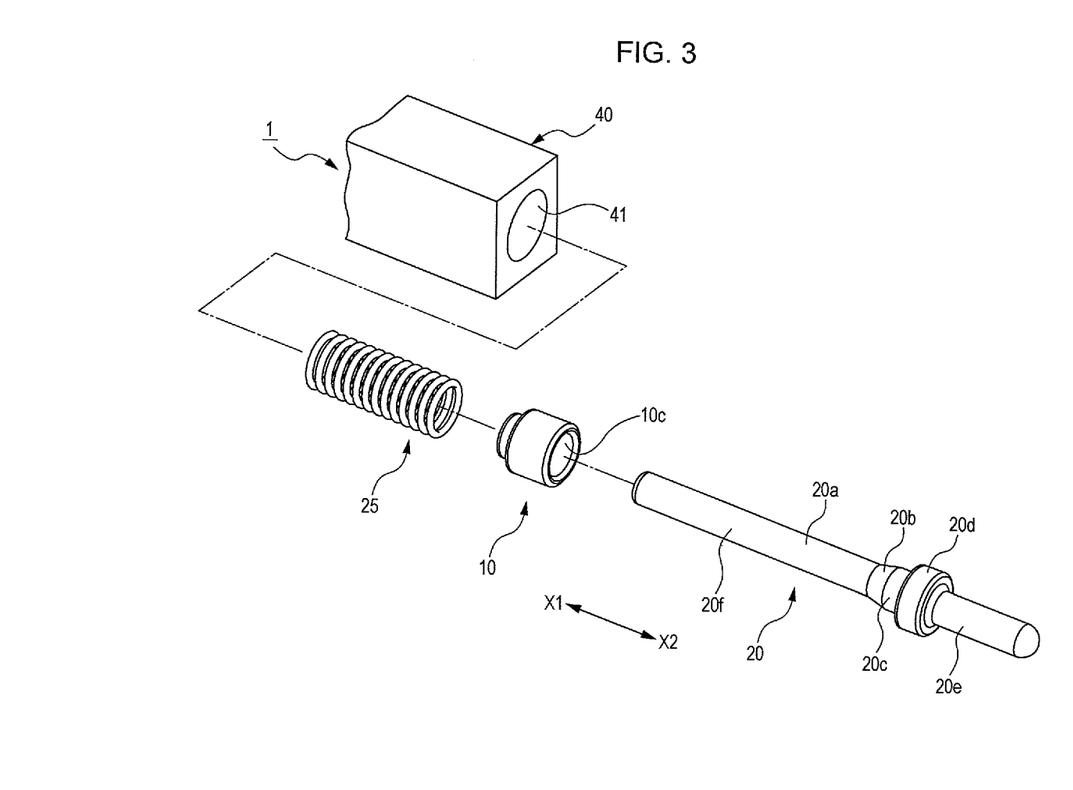
FIG. 3 is an exploded perspective view illustrating a slider, a helical compression spring, and an annular spacer.
Figure 4:
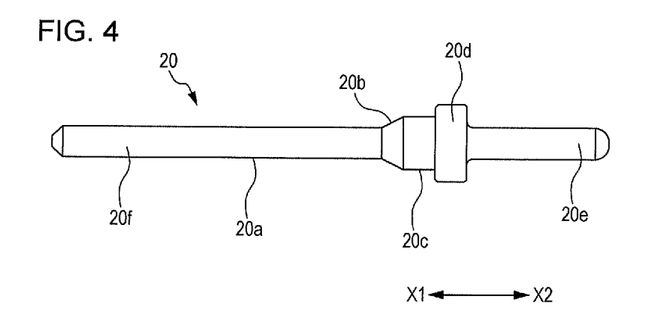
FIG. 4 is a schematic side view of the slider.
Figure 5:
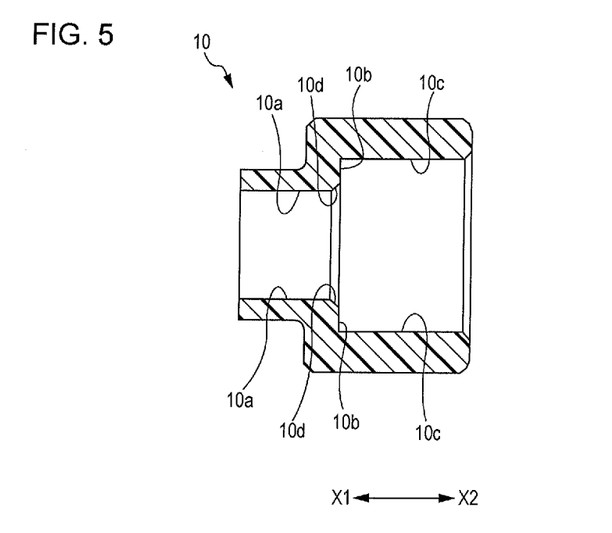
FIG. 5 is a schematic longitudinal sectional view of the annular spacer.
Figure 6:
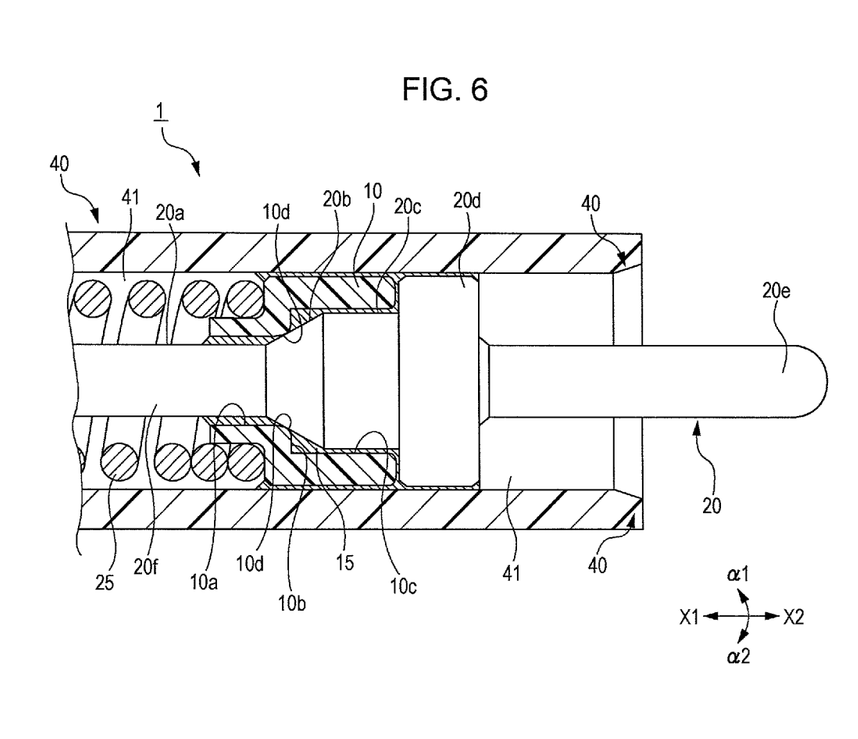
FIG. 6 is an explanatory view illustrating a contact state between the slider and the annular space.

FIG. 1 is a schematic view of a vehicular operating device 1 according to an embodiment of the present invention; more specifically FIG. 1 is a longitudinal sectional view illustrating an initial state where an operating member 40 is in a neutral posture. FIG. 2 is a longitudinal sectional view illustrating a state where the operating member 40 is swung into an operative posture. FIG. 3 is an exploded perspective view illustrating a slider 20, a helical compression spring 25, and an annular spacer 10. FIG. 4 is a schematic side view of the slider 20. FIG. 5 is a schematic longitudinal sectional view of the annular spacer 10. FIG. 6 is an explanatory view illustrating a contact state between the slider 20 and the annular spacer 10.

The vehicular operating device 1 is disposed near a steering wheel of an automobile, and is used, for example, to perform an operation of switching over light-up of a turn signal, an operation of switching over a window wiper, or an operation of lighting-up a headlight.

As illustrated in FIGS. 1 and 2, the vehicular operating device 1 includes an operating member 40. The operating member 40 is made of a synthetic resin material. The operating member 40 includes a not-illustrated support shaft, and it is rotatably supported to a bearing portion (not illustrated) that is provided on the vehicular body side.

As illustrated in FIGS. 1 to 3, a holding bore 41 is formed in the operating member 40. The slider 20, the annular spacer 10, and the helical compression spring 25 are fitted in the holding bore 41 to be slidable in directions to advance and retract therein. As illustrated in FIGS. 1 and 2, the slider 20 abuts against a cam surface 31 that is positioned in front of the slider 20 in the advancing direction (i.e., an X2 direction). The cam surface 31 is fixedly disposed on the vehicle body side. When the vehicular operating device 1 is assembled, the slider 20 is pushed into the holding bore 41 in an X1 direction, and a front end 20e of the slider 20 is held in pressure contact with the cam surface 31 in a state that the helical compression spring 25 is compressed in the back-and-forth direction (X1-X2 direction).

In an initial state, as illustrated in FIG. 1, the operating member 40 is in a neutral posture in which the operating member 40 is in a state pressed against and fitted into a cam slot 31a in the cam surface 31. Because the cam slot 31a is surrounded by cam mountains 31d, the operating member 40 is stably kept in the neutral posture.

When the operating member 40 is held by a hand and is manipulated to swing in an α1 direction as illustrated in FIG. 2, the front end 20e of the slider 20 is caused to slide in a way of riding over one of the cam mountains 31d on the cam surface 31 and then falling into a cam slot 31b. When the front end 20e of the slider 20 is sliding from the cam slot 31a toward the cam mountain 31d, the helical compression spring 25 is further compressed. After riding over the cam mountain 31d, the slider 20 is brought into a state swung to a first operative posture, illustrated in FIG. 2, by the action of the helical compression spring 25 pushing the front end 20e of the slider 20 in the X2 direction. When the operating member 40 is manipulated to swing in a return direction, the front end 20e of the slider 20 is caused to slide in a way of riding over the cam mountain 31d and then falling into the cam slot 31a. Thus, the operating member 40 is returned to the initial state in the neutral posture.

Similarly, when the operating member 40 is manipulated to swing in an α2 direction from the initial state in the neutral posture, the front end 20e of the slider 20 is caused to slide in a way of falling into a cam slot 31c, and the slider 20 comes into a second operative posture. When the operating member 40 is manipulated to swing in a return direction from the second operative posture, the front end 20e of the slider 20 is caused to slide in a way of falling into the cam slot 31a. Thus, the operating member 40 is returned to the initial state in the neutral posture.

The vehicular operating device 1 includes a change-over switch (not illustrated). When the operating member 40 comes into any of the neutral posture, the first operative posture, and the second operative posture, the change-over switch is operated corresponding to the relevant posture. In response to the switching operation of the change-over switch, a not-illustrated control unit executes control operations of, for example, switching over light-up of a turn signal, switching over an operation of a window wiper, or switching over light-up of a headlight.

The features of the vehicular operating device 1 according to this embodiment will be described below.

In the vehicular operating device 1 of this embodiment, the slider 20 is a metal shaft. As illustrated in FIGS. 3 and 4, the slider 20 includes a rear end portion 20f having a first outer peripheral surface 20a, a tapered second outer peripheral surface 20b, a third outer peripheral surface 20c adjacently positioned in front of the second outer peripheral surface 20b (in the X2 direction), a guide portion 20d, and a front end portion 20e. As illustrated in FIGS. 3 and 6, the rear end portion 20f of the slider 20 extends rearwards (in the X1 direction) through the holding bore 41 in the operating member 40, and the first outer peripheral surface 20a of the rear end portion 20f has a diameter smaller than the inner diameter of the helical compression spring 25. The diameter of the second outer peripheral surface 20b of the slider 20 is gradually increased from the first outer peripheral surface 20a forwards (i.e., in the X2 direction). The guide portion 20d of the slider 20 has an outer diameter allowing the guide portion 20d to slide along an inner peripheral surface of the holding bore 41. Since the slider 20 is the metal shaft and has rigidity, a good operation feeling can be obtained.

The annular spacer 10 is made of synthetic resin, and it has an outer diameter substantially equal to that of the guide portion 20d of the slider 20. As illustrated in FIG. 5, the annular spacer 10 has a first inner peripheral surface 10a, a second inner peripheral surface 10b formed to be positioned in front of the first inner peripheral surface 10a (in the X2 direction) and to be flared to have a diameter larger than that of the first inner peripheral surface 10a, and a third inner peripheral surface 10c adjacently positioned in front of the second inner peripheral surface 10b. The annular spacer 10 further includes, at a boundary between the first inner peripheral surface 10a and the second inner peripheral surface 10b, a contact portion 10d coming into contact with the second outer peripheral surface 20b of the slider 20. The contact portion 10d is formed by chamfering one end of the first inner peripheral surface 10a into a rounded shape. The annular spacer 10 is formed such that a diameter of the first inner peripheral surface 10a allows it to be fitted along the first outer peripheral surface 20a of the slider 20. Furthermore, the third inner peripheral surface 10c is formed to have a diameter substantially equal to that of the third outer peripheral surface 20c of the slider 20. In other words, the annular spacer 10 has the outer diameter allowing the annular spacer 10 to slide along the inner peripheral surface of the holding bore 41, and the diameter of the third inner peripheral surface 10c is substantially equal to that of the third outer peripheral surface 20c of the slider 20. As a result, wobbling of the annular spacer 10 is suppressed. Moreover, as illustrated in FIG. 6, slight gaps are formed between the first outer peripheral surface 20a of the slider 20 and the first inner peripheral surface 10a of the annular spacer 10 and between the third outer peripheral surface 20c of the slider 20 and the third inner peripheral surface 10c of the annular spacer 10. A lubricant 15 is applied to those gaps. In addition, a gap between the tapered second outer peripheral surface 20b and the third inner peripheral surface 10c serves as a storage space for the lubricant 15. Accordingly, a large amount of the lubricant 15 can be stored, and the stable sliding operation can be ensured for a long term.

The helical compression spring 25 is made of a metal having spring properties. As illustrated in FIG. 1, the helical compression spring 25 is abutted at one end on the X1 side against the operating member 40 and is fitter at the other end on the X2 side over the annular spacer 10. As illustrated in FIG. 6, the helical compression spring 25 is held by the annular spacer 10 in a state not contacting the first outer peripheral surface 20*a* and the guide portion 20*d* of the slider 20. Preferably, the helical compression spring 25 is tightly fitted to the annular spacer 10 to be expanded and contracted together with the advancing and contracting operation of the annular spacer 10.

The helical compression spring 25 is in a compressed state, and the contact portion 10*d* of the annular spacer 10 is engaged against and contacted with the tapered second outer peripheral surface 20*b* of the slider 20. Thus, the helical compression spring 25 biases the slider 20 with the annular spacer 10 interposed therebetween, and brings the front end 20*e* of the slider 20 into pressure contact with the cam surface 31.

When the front end 20*e* of the slider 20 is caused to slide along the cam surface 31 with the swing manipulation of the operating member 40, minute vibrations are generated in both the annular spacer 10 and the slider 20 that are biased by the helical compression spring 25. If those minute vibrations and collisions between the parts resulting from those vibrations are generated in sound waves including audible frequency components, the generated sound waves are audible as abnormal noise in the operation. In particular, collision between metals generates fairly unpleasant noise.

In the vehicular operating device 1 of this embodiment, since the first outer peripheral surface 20*a* and the guide portion 20*d* of the slider 20 are not directly contacted with the helical compression spring 25 by employing the above-described structure that is relatively simple, the abnormal noise resulting from the collision between metals is not generated. Furthermore, the annular spacer 10 is engaged at the contact portion 10*d* against the tapered second outer peripheral surface 20*b* of the slider 20, and a contact area between the annular spacer 10 and the slider 20 is small, the abnormal noise resulting from the collision between the annular spacer 10 and the slider 20 is less apt to generate. Moreover, the lubricant 15 is held in the gaps between the annular spacer 10 and the slider 20 and serves as a buffer to quickly attenuate the minute vibrations. This further contributes to preventing the generation of the abnormal noise. Hence the abnormal noise can be reduced with the simple structure.

Advantageous effects of this embodiment will be described below.

The vehicular operating device 1 of this embodiment includes the operating member 40 manipulated in a swingable manner, the slider 20 fitted in the holding bore 41 formed in the operating member 40 to be slidable therein, the cam surface 31 positioned in front of the slider 20, and the helical compression spring 25 pressing the slider 20 into pressure contact with the cam surface 31. In the vehicular operating device 1, when the operating member 40 is manipulated to swing, the slider 20 is caused to slide along the cam surface 31. The slider 20 is the metal shaft, and it includes the first outer peripheral surface 20*a* with the diameter being smaller than the inner diameter of the helical compression spring 25, and the guide portion 20*d* with the outer diameter allowing the guide portion 20*d* to slide along the inner peripheral surface of the holding bore 41. The annular spacer 10 made of resin and having the outer diameter substantially equal to that of the guide portion 20*d* is fitted between the guide portion 20*d* and the helical compression spring 25, and the helical compression spring 25 biases the slider 20 with the annular spacer 10 interposed therebetween. The annular spacer 10 holds the helical compression spring 25 in the state not contacting the first outer peripheral surface 20*a* and the guide portion 20*d* of the slider 20.

With the swing manipulation of the operating member 40, the slider 20 is caused to slide in a way of riding over the cam mountain 31*d* on the cam surface 31 and then falling into any of the cam slots 31*a*, 31*b* and 31*c*. According to the features described above, since the outer peripheral surfaces (i.e., the first outer peripheral surface 20*a* and the guide portion 20*d*) of the slider 20 are not directly contacted with the helical compression spring 25, the abnormal noise resulting from the collision between metals is not generated even when the impact generated upon the slider 20 falling into any of the cam slots 31*a*, 31*b* and 31*c* is applied to the helical compression spring 25. As a result, it is possible to reduce the abnormal noise in the operation, and to obtain a good operation feeling with the simple structure.

Furthermore, in the vehicular operating device 1 of this embodiment, the slider 20 has, between the first outer peripheral surface 20*a* and the guide portion 20*d*, the tapered second outer peripheral surface 20*b* of which diameter gradually increases from the first outer peripheral surface 20*a* forwards. The annular spacer 10 has the first inner peripheral surface 10*a*, the second inner peripheral surface 10*b* formed to be flared to have the diameter larger than that of the first inner peripheral surface 10*a*. The annular spacer 10 further includes, at the boundary between the first inner peripheral surface 10*a* and the second inner peripheral surface 10*b*, the contact portion 10*d* coming into contact with the second outer peripheral surface 20*b* of the slider 20.

According to the features described above, the annular spacer 10 is engaged at the contact portion 10*d* against the tapered second outer peripheral surface 20*b* of the slider 20, and the contact area between the annular spacer 10 and the slider 20 is small. Hence the abnormal noise due to the collision between the annular spacer 10 and the slider 20 is less apt to generate.

Moreover, in the vehicular operating device 1 of this embodiment, the slider 20 has the third outer peripheral surface 20*c* adjacently positioned in front of the second outer peripheral surface 20*b*. The annular spacer 10 has third inner peripheral surface 10*c* adjacently positioned in front of the second inner peripheral surface 10*b*. The diameter of the third inner peripheral surface 10*c* is substantially equal to that of the third outer peripheral surface 20*c*.

According to the features described above, wobbling of the annular spacer 10 can be suppressed, and the generation of the abnormal noise can be prevented more effectively.

In addition, the gaps are formed between the slider 20 and the annular spacer 10, and the lubricant 15 is applied to those gaps.

According to the features described above, the lubricant 15 is held in the gaps between the slider 20 and the annular spacer 10 and serves as a buffer. This further contributes to preventing the generation of the abnormal noise.

It is to be noted that, while the vehicular operating device 1 according to the embodiment of the present invention has been described in detail above, the present invention is not limited to the foregoing embodiment and the present invention can be practiced in variously modified forms within the scope not departing from the gist of the invention. The present invention may be practiced in forms modified as follows, for example, and those modifications also falls within the technical scope of the present invention.

(1) While, in the above-described embodiment, the slider 20 has the tapered second outer peripheral surface 20*b* and the third outer peripheral surface 20*c* adjacently positioned in front of the second outer peripheral surface 20b, the slider 20 may have a configuration including only the guide portion 20d in addition to the first outer peripheral surface 20a. As an alternative, the slider 20 may have a configuration including only the tapered second outer peripheral surface 20b between the first outer peripheral surface 20a and the guide portion 20d. Even with the slider 20 having those modified configurations, the helical compression spring 25 can be held by the annular spacer 10 in the state not contacting the first outer peripheral surface 20a and the guide portion 20d of the slider 20.

(2) While, in the above-described embodiment, the operating member 40 is swung to three postures, i.e., the neutral posture, the first operative posture, and the second operative posture, a third operative posture, etc. may be further provided in a direction extending from the first operative posture and the second operative posture. Moreover, while, in the above-described embodiment, the operating member 40 is swung in the α1-α2 direction, the operating member 40 may be additionally swung in a third direction intersecting the X1-X2 direction and the α1-α2 direction.

What is claimed is:

1. A vehicular operating device comprising:
an operating member manipulated in a swingable manner;
a slider fitted in a holding bore disposed in the operating member to be slidable in directions to advance and retract therein;
a cam surface positioned in front of the slider in the advancing direction of the slider; and
a helical compression spring pressing the slider into pressure contact with the cam surface,
the slider sliding along the cam surface when the operating member is manipulated to swing,
the slider comprising a metal shaft and including a first outer peripheral surface with a diameter being smaller than an inner diameter of the helical compression spring, and a guide portion with an outer diameter allowing the guide portion to slide along an inner peripheral surface of the holding bore,
the slider further including: an annular spacer made of resin, fitted between the guide portion and the helical compression spring, and having an outer diameter substantially equal to an outer diameter of the guide portion, the helical compression spring biasing the slider with the annular spacer interposed therebetween; and between the first outer peripheral surface and the guide portion, a tapered second outer peripheral surface with a diameter gradually increasing from the first outer peripheral surface forwards,
the annular spacer having a first inner peripheral surface with a diameter allowing the first inner peripheral surface to be fitted along the first outer peripheral surface, a second inner peripheral surface configured to be positioned in front of the first inner peripheral surface and to be flared to have a diameter larger than the diameter of the first inner peripheral surface, and a contact portion coming into contact with the second outer peripheral surface of the slider, the contact portion being positioned at a boundary between the first inner peripheral surface and the second inner peripheral surface; and
the annular spacer holding the helical compression spring in a state not contacting the first outer peripheral surface and the guide portion of the slider.

2. The vehicular operating device according to claim 1, wherein the slider further includes a third outer peripheral surface adjacently positioned in front of the second outer peripheral surface, and
the annular spacer further includes a third inner peripheral surface adjacently positioned in front of the second inner peripheral surface, the third inner peripheral surface having a diameter substantially equal to a diameter of the third outer peripheral surface.

3. The vehicular operating device according to claim 2, wherein a gap is formed between the slider and the annular spacer, and a lubricant is applied to the gap.

* * * * *